(12) United States Patent
Moustafa et al.

(10) Patent No.: US 11,361,329 B2
(45) Date of Patent: Jun. 14, 2022

(54) SYSTEMS AND METHODS FOR GENERATING OPTIMIZED MARKET PLANS

(71) Applicant: Walmart Apollo, LLC, Bentonville, AR (US)

(72) Inventors: Rida E. Moustafa, Bentonville, AR (US); Justin Michael Higham, Bentonville, AR (US); Lloyd Andrew Lancelot, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 118 days.

(21) Appl. No.: 15/995,333

(22) Filed: Jun. 1, 2018

(65) Prior Publication Data

US 2018/0349925 A1 Dec. 6, 2018

Related U.S. Application Data

(60) Provisional application No. 62/513,547, filed on Jun. 1, 2017.

(51) Int. Cl.
*G06Q 30/02* (2012.01)
*H04W 4/021* (2018.01)
(Continued)

(52) U.S. Cl.
CPC ......... *G06Q 30/0201* (2013.01); *G06N 3/126* (2013.01); *G06Q 10/04* (2013.01); *H04W 4/021* (2013.01)

(58) Field of Classification Search
CPC .... G06Q 30/0202; G06Q 10/04; G06N 3/126; H04W 4/021; H04W 4/04; H04W 4/043; H04W 4/046
(Continued)

(56) References Cited

U.S. PATENT DOCUMENTS 5,491,629 A   2/1996  Fox et al.
6,609,101 B1  8/2003  Landvater
(Continued)

FOREIGN PATENT DOCUMENTS

JP    2009 043291 A1    2/2009
WO    WO-2009061514 A1 * 5/2009 ............. G16B 50/00

OTHER PUBLICATIONS

Daskin et al.; "Facility Location in Supply Chain Design" Department of Industrial Engineering and Management Sciences Northwestern University, Evanston, Illinois 60208-3119, U.S.A. Working Paper No. 03-010; Dec. 2003; 38 pages.
(Continued)

*Primary Examiner* — Dylan C White
(74) *Attorney, Agent, or Firm* — Patterson Thuente Pedersen, P.A.

(57) ABSTRACT

Systems and methods for ranking or optimizing market configurations are disclosed. Optimized configurations of stores and formats in a market bounded within a geographic area are produced. The geographic area is divided into cells, and the cell attributes are used to determine which store formats can be present. Market configurations for each cell are provided to forecasters for determining of a first fitness criteria. Market configurations are filtered based on the first fitness criteria. Impacts between market configurations are calculated. A genetic algorithm produces a plurality of market solutions. In embodiments, optimization tasks are performed in parallel.

22 Claims, 15 Drawing Sheets

(51) Int. Cl.
*G06Q 10/04* (2012.01)
*G06N 3/12* (2006.01)

(58) Field of Classification Search
USPC .......................................................... 705/7.29
See application file for complete search history.

(56) References Cited

U.S. PATENT DOCUMENTS

| | | | |
|---|---|---|---|
| 7,063,263 B2 | 6/2006 | Swartz et al. | |
| 7,383,200 B1 | 6/2008 | Walker et al. | |
| 7,530,025 B2 | 5/2009 | Ramarajan et al. | |
| 7,702,518 B2 | 4/2010 | Kelly et al. | |
| 7,856,370 B2 | 12/2010 | Katta et al. | |
| 7,970,640 B2* | 6/2011 | Eder | G06Q 10/10 705/7.28 |
| 8,041,648 B2 | 10/2011 | Rossmark et al. | |
| 8,538,800 B2 | 9/2013 | Gupta et al. | |
| 8,577,716 B2 | 11/2013 | Bernick et al. | |
| 8,600,796 B1 | 12/2013 | Sterne et al. | |
| 8,738,422 B2 | 5/2014 | Lerner et al. | |
| 8,874,477 B2* | 10/2014 | Hoffberg | G06Q 10/0631 705/37 |
| 8,909,771 B2 | 12/2014 | Heath | |
| 9,558,458 B2 | 1/2017 | Yang et al. | |
| 9,760,840 B1 | 9/2017 | Tyagi et al. | |
| 10,380,270 B2* | 8/2019 | Detwiler | G06F 17/50 |
| 2005/0049914 A1 | 3/2005 | Parish | |
| 2006/0010027 A1 | 1/2006 | Redman | |
| 2006/0095325 A1 | 5/2006 | Bell et al. | |
| 2006/0149634 A1 | 7/2006 | Egrin et al. | |
| 2006/0259350 A1* | 11/2006 | Ryan | G06Q 20/203 705/7.31 |
| 2007/0055563 A1 | 3/2007 | Godsey et al. | |
| 2008/0159634 A1 | 7/2008 | Sharma et al. | |
| 2008/0189170 A1 | 8/2008 | Ramachandra | |
| 2009/0076888 A1 | 3/2009 | Oster et al. | |
| 2009/0144097 A1 | 6/2009 | Fassio et al. | |
| 2009/0276290 A1 | 11/2009 | Sill | |
| 2010/0217650 A1* | 8/2010 | Hartnell | G06Q 10/04 705/7.29 |
| 2011/0082765 A1 | 4/2011 | Mazor | |
| 2012/0084118 A1 | 4/2012 | Bai et al. | |
| 2014/0027876 A1 | 1/2014 | Holenarsipur et al. | |
| 2014/0046893 A1 | 2/2014 | Galloway et al. | |
| 2014/0074732 A1* | 3/2014 | Den Herder | G06Q 10/10 705/306 |
| 2014/0143039 A1 | 5/2014 | Branton | |
| 2014/0180785 A1 | 6/2014 | Argue et al. | |
| 2015/0142591 A1 | 5/2015 | High et al. | |
| 2015/0227951 A1 | 8/2015 | Hawley et al. | |
| 2017/0278053 A1 | 9/2017 | High et al. | |
| 2017/0308847 A1 | 10/2017 | Todd et al. | |
| 2017/0323251 A1 | 11/2017 | Bode et al. | |
| 2017/0323367 A1 | 11/2017 | Crow | |
| 2018/0113977 A1* | 4/2018 | Hodjat | G16B 20/00 |
| 2018/0232750 A1 | 8/2018 | Spencer et al. | |

OTHER PUBLICATIONS

International Search Report and Written Opinion for corresponding International Application No. PCT/US2018/035559 dated Aug. 31, 2018; 7 pages.

Goodchild, Michael; "ILACS: A Location-Allocation Model for Retail Site Selection"; [online] Journal of Retailing 60 (published 1984): 84-100; 17 pages total [retrieved on Aug. 20, 2018]; http://www.geog.ucsb.edu/~good/papers/65.pdf. The University of Western Ontario, London, Canada.

Application and Filing Receipt for U.S. Appl. No. 15/880,782, filed Jan. 26, 2018, Inventor(s): Spencer et al.

Application and Filing Receipt for U.S. Appl. No. 15/465,698, filed Mar. 22, 2017, Inventor(s): High et al.

Application and Filing Receipt for U.S. Appl. No. 15/585,536, filed May 3, 2017, Inventor: Crow.

Application and Filing Receipt for U.S. Appl. No. 15/493,729, filed Apr. 21, 2017, Inventor(s): Todd et al.

Application and Filing Receipt for U.S. Appl. No. 15/583,241, filed May 1, 2017, Inventor(s): Bode et al.

Liu et al.; Data mining on time series: an illustration using fast-food restaurant franchise data, Computational Statistics & Data Analysis 37, 2001, pp. 455-476; 22 pages total.

Beal, Vangie. "Assortment intelligence", retrieved from http://www.webopedia.com/TERM/A/assortment_intelligence.html. Retrieved on Oct. 15, 2018, 2 pages.

Fisher et al. "Which Products Should You Stock?", Harvard Business Review, Nov. 2012 Issue, 16 pages.

Rajpurohit, Anmol. "Big Data & Analytic for Retail Summit 2014 Chicago", retrieved from http://www.kdnuggets.com/2014/10/bigdataanalyticsretailsummitchicagoday2.Html. Retrieved on Feb. 19, 2016, 6 pages.

Lanham et al., "Enhancing Retail Assortment and Order Fulfillment with Big Data Decision Support", Department of Business Information Technology, Virginia Tech, 30 pages. 2015 Frontiers in Service Conference (Jul. 9-12, 2015).

Swedberg, "French Supermarket Tests NFC Tool for Visually Disabled Shoppers", dated Sep. 21, 2011, 2 pages.

Resource Library > Concepts; "Monitoring and Improving Layout", retrieved on Feb. 5, 2016, via https://www.dlsweb.rmit.edu.au/toolbox/retail/toolbox/index.htm?unit_mm/concepts/mmc0107.htm; 1 page.

Brown; ICC | DecisionServices, "How Retailers Can Use Customer Feedback Data To Improve Store Layout", dated Mar. 25, 2014, 11 pages.

Out of Stock Notification by Amasty, Magento Connect; retrieved from https://www.magentocommerce.com/magentoconnect/outofstocknotificationbyamasty.html; on Jan. 23, 2016; 5 pages.

* cited by examiner

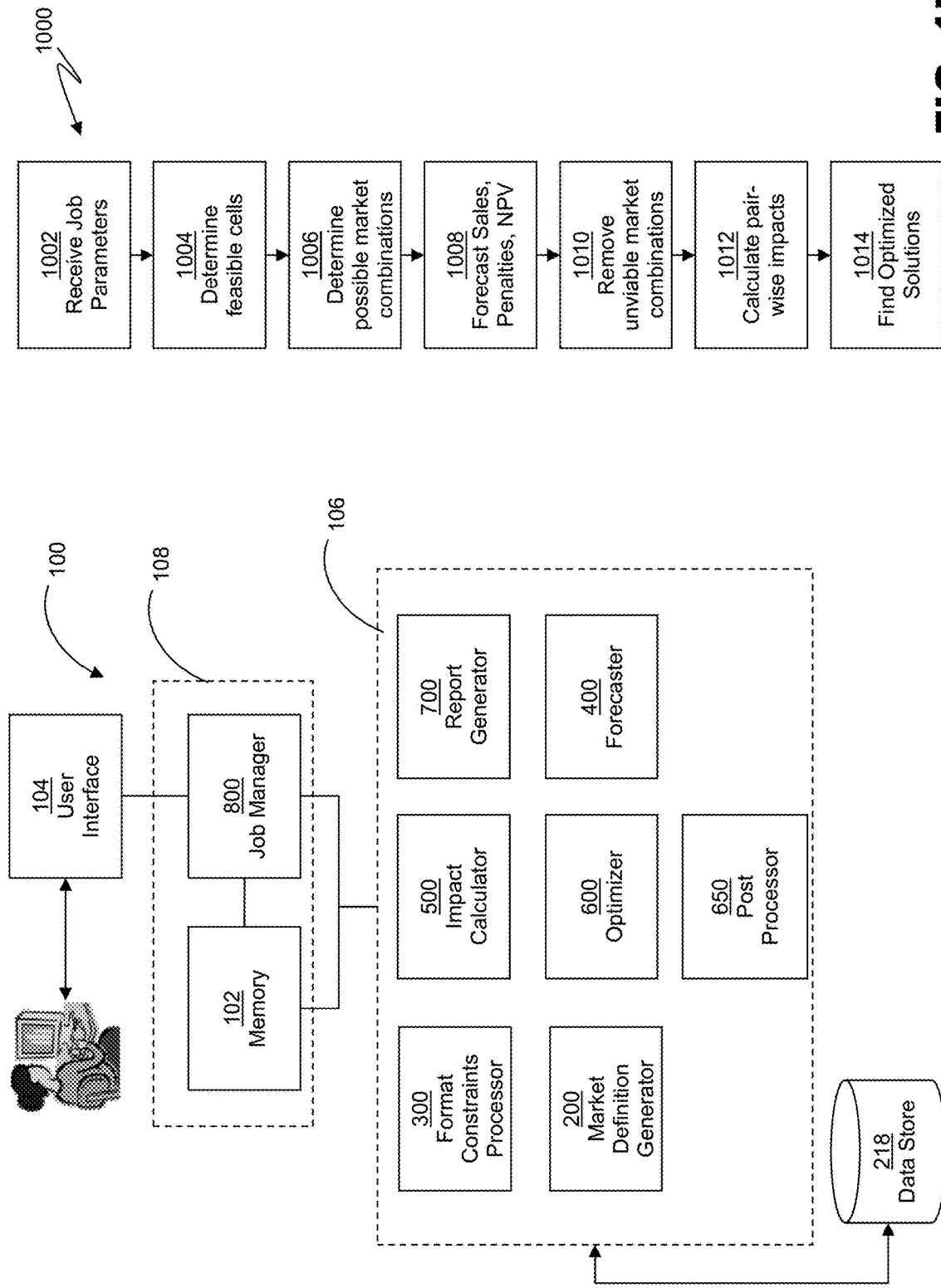

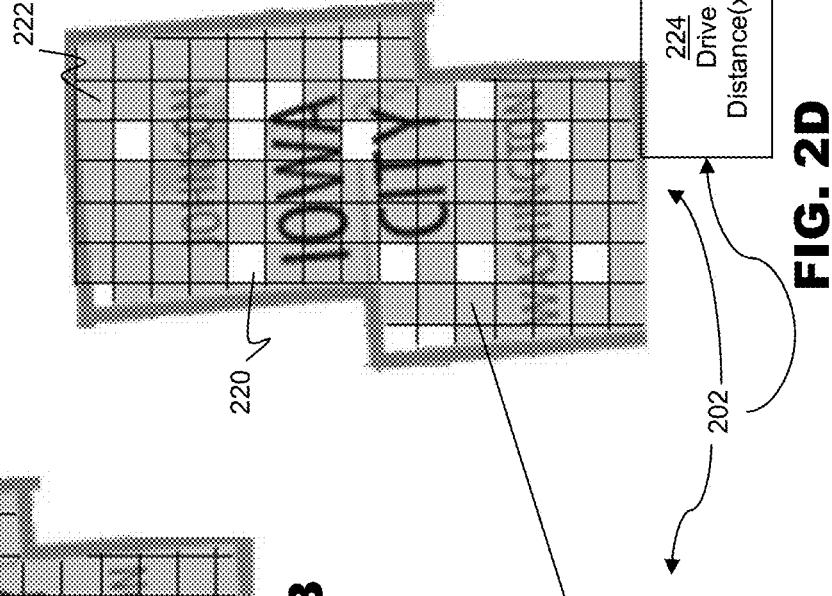
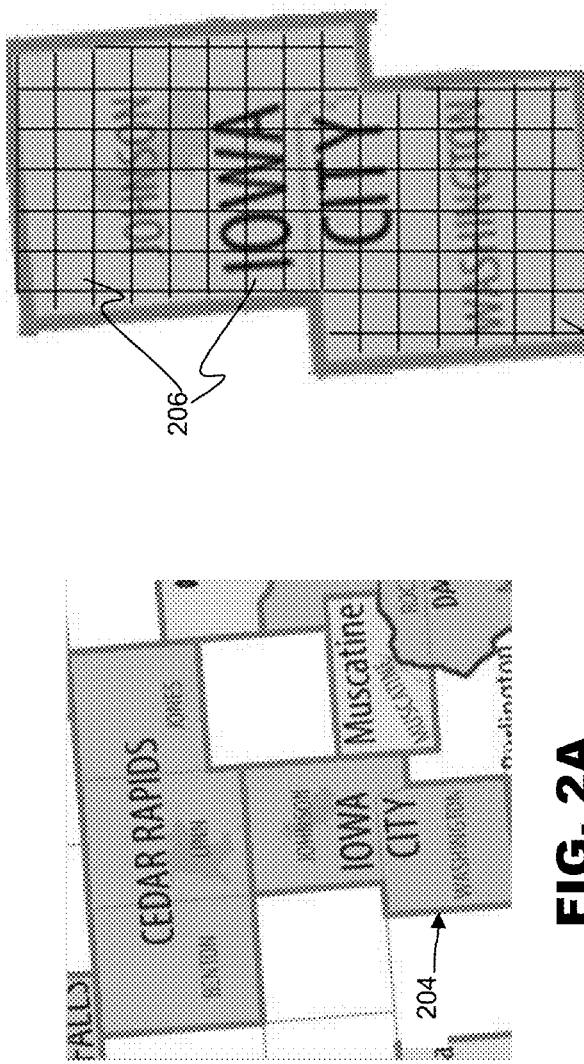
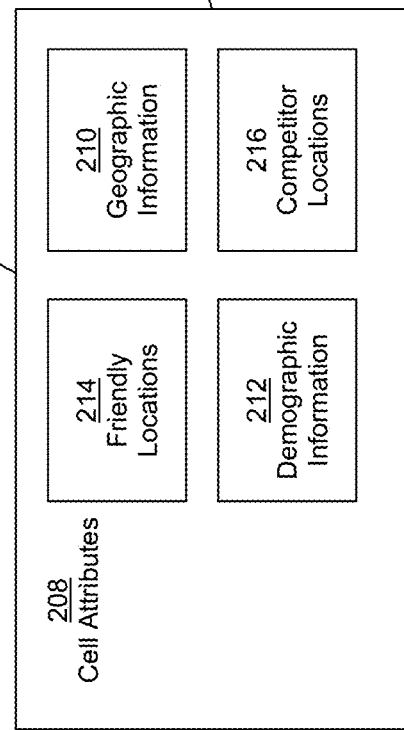
FIG. 2A
FIG. 2B
FIG. 2C
FIG. 2D

|  | | Cell 1 | | Cell 2 | | Cell 3 |
|---|---|---|---|---|---|---|
|  |  | MC1 | MC2 | MC3 | MC4 | MC5 | MC6 |
| Cell 1 | MC1 | x | x | $Impact_{1,3}$ | $Impact_{1,4}$ | $Impact_{1,5}$ | $Impact_{1,6}$ |
|  | MC2 | x | x | $Impact_{2,3}$ | $Impact_{2,4}$ | $Impact_{2,5}$ | $Impact_{2,6}$ |
| Cell 2 | MC3 | $Impact_{3,1}$ | $Impact_{3,2}$ | x | x | x | $Impact_{3,6}$ |
|  | MC4 | $Impact_{4,1}$ | $Impact_{4,2}$ | x | x | x | $Impact_{4,6}$ |
|  | MC5 | $Impact_{5,1}$ | $Impact_{5,2}$ | x | x | x | $Impact_{5,6}$ |
| Cell 3 | MC6 | $Impact_{6,1}$ | $Impact_{6,2}$ | $Impact_{6,3}$ | $Impact_{6,4}$ | x | x |

SYSTEMS AND METHODS FOR GENERATING OPTIMIZED MARKET PLANS

RELATED APPLICATION

The present application claims the benefit of U.S. Provisional Application No. 62/513,547 filed Jun. 1, 2017, which is hereby incorporated herein in its entirety by reference.

TECHNICAL FIELD

Embodiments of the present disclosure relate generally to the field of computer-assisted real estate planning. In particular, embodiments relate to systems and methods for generating optimized market plans for real estate planning purposes.

BACKGROUND

Retailers, or other users of commercial real estate, consider a multitude of variables and factors when selecting sites and formats for stores in a given market. An optimal store site selection is often one that maximizes certain business goals, such as the net present value (NPV) of future profits of a store site, while minimizing others, such as investment or remodeling costs. Selection of even a single store site is therefore a complex task that requires multiple factors and information harvesting about stores, customers, financial predictions, trade area metrics, and competitors as well as population growth and econometrics indices.

Financial prediction models have been used to optimize site selection for real estate transactions. Such conventional models often function by combining historical data for existing stores with known demographic information about potential customers within a geographic area. These models can assist planners in selecting an optimal site for a single new store but are limited by the information considered, particularly because they are based on existing store data.

The decision facing large organizations is often more involved than the placement of a single new store. Organizations often would like to determine the best arrangement of stores to achieve the organization's goals within a geographical area or market. Market plans can be developed that identify proposed store formats for each section of a geographical area. In implementing market plans, an organization may open new stores, remodel existing stores to change their format or add new features, sell or lease out-lot parcels to co-tenants, or close existing stores all together.

Conventional site selection methods that rely solely on classical optimization techniques such as Monte Carlo methods are not well suited to efficiently generating and ranking market plans due to the number of variables and constraints that must be considered. Multi-constraint optimization techniques such as genetic algorithms can evaluate large populations of possible solutions but can be computationally infeasible when the search space is large.

What is needed in the industry, therefore, are systems and methods capable of generating optimized market plans in a computationally efficient manner.

SUMMARY

Embodiments of the present disclosure provide systems and methods enabling planners to generate optimized market plans for a given geographic area in an efficient manner. Embodiments of the disclosed market optimization system can receive data defining a target region (including geographic and demographic information) and the constraints regarding one or more possible store formats that could be placed in the region. Given user-configurable assumptions, the systems and methods can produce one or more market optimization solutions that can provide guidance for opening, remodeling, and/or closing stores. Remodeling decisions can include changing a store format, adding new features (such as fuel, or fast pickup options), selling or leasing out-lot parcels or store space to co-tenants. Embodiments of the present disclosure can be used to predict store sites and store formats in certain trade areas or nationwide. In addition, embodiments can be adapted to supply chain planning to find the optimal paths from a distribution center to stores.

Embodiments of the present disclosure consolidate multiple models for store sales forecasting, store cannibalization, competitor impact and customer behavior to predict the optimal store locations and formats in a given geographic area. In embodiments, a market optimization system integrates Monte Carlo simulation and a genetic algorithm using grid-based computation and scoring to solve a multi-constraint optimization problem.

In a first phase, Monte Carlo or other forecasting simulations are performed in order to determine an NPV or other prediction for each possible store location and format in each segment of a geographic area, assuming that only one segment will be changing. In a second phase, an optimization that considers the impacts of each solution across segments is performed.

Embodiments of the present disclosure include a market optimization system for determining one or more optimal market solutions for a geographic area that is divisible into one or more cells (which can be squares in a grid), each market solution assigning a market combination to each of the one or more cells, each market combination including zero or more stores each having a format. In embodiments the system comprises a geographical processor, or market definition generator, configured to receive data defining a boundary of the geographic area, subdivide the geographic area into the one or more cells, determine a set of feasible cells based on location attributes of the cell and one or more feasibility criteria, augment the data stored for the cell with a consumer population attribute, an existing store attribute and a competitor information attribute for each feasible cell, and store the set of feasible cells in the memory.

In embodiments, the system further comprises a format constraints processor configured to determine at least one possible market combination for each feasible cell of the set of feasible cells based on at least one of the at least one location attribute, the consumer population attribute, the existing store attribute, and the competitor information attribute of the feasible cell, and at least one constraint of each format, and store each possible market combination in the memory associated with the feasible cell.

In embodiments, the system further comprises a forecaster configured to determine a set of viable market combinations of each feasible cell by predicting a first objective value (which can be one of net present value, market share, or shareholder return) for each of the at least one possible market combinations of the feasible cell, and adding each of the at least one possible market combinations of each feasible cell to the set of viable market combinations if the first objective value of the possible market combination meets a first objective threshold, and store the set of viable market combinations of each feasible cell in the memory associated with the feasible cell.

In embodiments, the system further comprises an impact calculator configured to determine an impact value for each pair of market combinations having a first market combination selected from the set of viable market combinations of a first cell and a second market combination selected from the set of viable market combinations of a second cell, and store each impact value in the memory associated with the first market combination and the second market combination.

In embodiments, an optimizer is configured to generate an output including one or more legal market solutions ranked by a fitness value. Each legal market solution has a market combination assigned to each cell of the geographic area whereby each cell that is not in the set of feasible cells has a market combination including no stores, and each cell that is in the set of feasible cells has a market combination that is in the set of viable market combinations for the feasible cell. The fitness value is based on the sum of the first objective value of each market combination in the market solution or a second objective value of each market combination, and the impact values for each pair of market combinations in the solution.

In embodiments, the optimizer generates the market solutions by seeding a genetic algorithm with a population of one or more randomly generated legal market solutions, iterating the genetic algorithm by modifying the population based on the fitness value of each of the one or more legal market solutions of the population and adding the legal market solutions with the highest fitness value to the output.

In embodiments, the optimizer comprises a plurality of parallel fitness evaluators each configured to determine a fitness value of a legal market solution, each legal market solution in the population assigned to one of the parallel fitness evaluators such that the fitness value of a plurality of legal market solutions can be determined simultaneously.

In embodiments, the forecaster comprises a plurality of parallel objective evaluators each configured to determine the first objective value of a market combination, and each viable market combination is assigned to one of the parallel objective evaluators such that the first objective value of a plurality of viable market combinations can be determined simultaneously. In embodiments, the impact calculator comprises a plurality of parallel impact evaluators each configured to determine the impact value of a pair of market combinations such that a plurality of impact values can be determined simultaneously.

In embodiments, a post process can add additional features such as online pickup and fueling stations to stores or cells of a market solution based on a predicted change in the first objective value resulting from the addition of the additional feature to the store or cell.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 1A is a block diagram depicting components of a market optimization system, according to an embodiment.

FIG. 1B is a flowchart depicting a method for market optimization, according to an embodiment.

FIG. 2A is a map portion depicting a selected geographic area, according to an embodiment.

FIG. 2B is a map portion depicting a selected geographic area subdivided into cells, according to an embodiment.

FIG. 2C is a block diagram depicting data elements associated with a cell, according to an embodiment.

FIG. 2D is a map portion depicting the subdivided geographic area of FIG. 2B indicating infeasible cells, according to an embodiment.

FIG. 5 is a chart depicting a data structure for pairwise impact calculations, according to an embodiment.

FIG. 7E is a screen shot depicting a sample screen of a user interface, according to an embodiment.

Figures 3A, 3B:
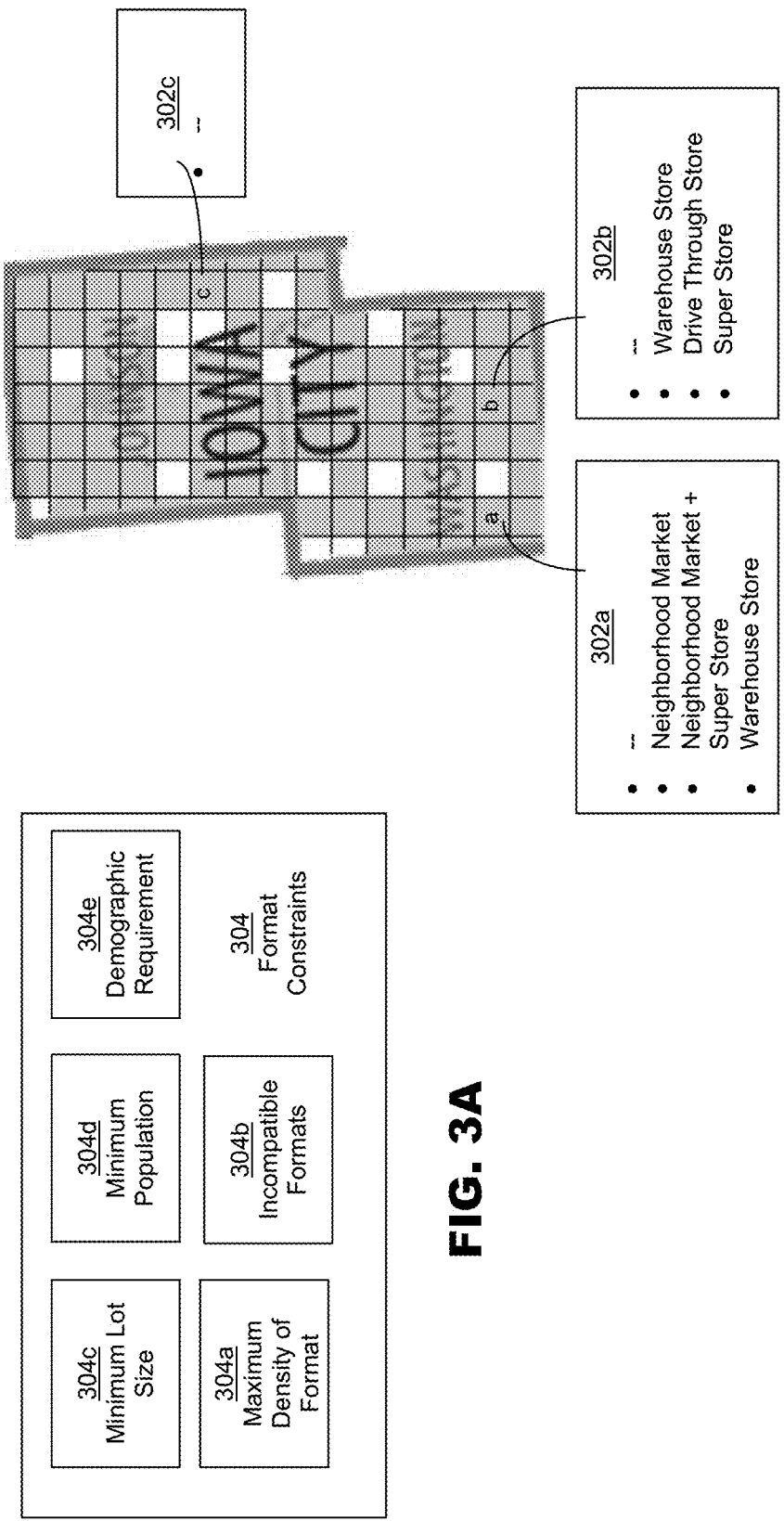
FIG. 3A is a block diagram depicting data elements associated with a format constraint, according to an embodiment.
FIG. 3B is a map portion depicting the subdivided geographic area of FIG. 2B indicating possible market combinations, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1A is a schematic diagram depicting components and engines of a market optimization system 100 according to embodiments of the present disclosure. In embodiments, market optimization system 100 can include user interface 104, processing engines 106, and shared resources 108.

As will be described in more detail below, user interface 104 is configured to enable a user to submit one or more requests for the generation of optimized market solutions to system 100. In various embodiments, user interface 104 can be a command line interface, a graphical user interface, a web browser accessible interface or a programmatic interface such as an API or DLL enabling control of system 100 by other software systems and components. In some embodiments, user interface 104 can be presented on a client computing system connected by a wired or wireless network (or other) connection to components of market optimization system 100.

In embodiments, processing engines 106 can include market definition generator 200, format constraints processor 300, forecaster 400, impact calculator 500, optimizer 600, and report generator 700. The various processing engines 106 can be hardware and/or software modules each configured to receive and process various data inputs and outputs as will be described below. In embodiments, processing engines 106 can reside on one or more computing devices, which can be in data contact with one another and with shared resources 108. The structure and functionality of the various processing engines 106 will be described in more detail below.

Shared resources 108 can include memory 102 and, in embodiments, job manager 800. Memory 102 provides temporary and permanent data storage for components of system 100. In embodiments, communication between the various components of system 100 can be performed by synchronous or asynchronous writing and reading of data to and from memory 102. Memory 102 can reside on a common computing system to each or all of the other components of system 100, or can be connected via a wired or wireless network connection to the other components of system 100.

Job manager 800 can be one or more hardware and/or software modules configured to manage the processing, by the various processing engines 106, of one or more requests for optimized market plans. Job manager 800 is arranged in data communication with memory 102, user interface 104, and each of the various processing engines 106.

The structure and functionality of each of the components of market optimization system 100 can be better understood upon review of the flowchart of FIG. 1B, which depicts an embodiment of method 1000 for generation of optimized market solutions. At 1002, one or more job parameters are received by job manager 800. As discussed below, job manager 800 can control the execution of other components of system 100 in order to perform the additional tasks of method 1000. At 1004, market definition generator 200 can determine a set of feasible cells. At 1006, format constraints processor 300 can determine the possible market combinations for each feasible cell in embodiments. At 1008, forecaster 400 can determine viability criteria based on forecasted sales and other models, according to embodiments. At 1010, non-viable market combinations can be removed. At 1012, pairwise impacts between market combinations can be calculated by impact calculator 500. At 1014, optimizer 600 can perform an optimization routine such as a genetic algorithm to find one or more optimized market solutions, which can be augmented by post processor 650.

As will be recognized by those of ordinary skill in the art, multivariable optimization problems can have a number of solutions that are quite good, but not mathematically "optimal." This can particularly be the case when the solution space includes local minima and maxima. The generated market solutions can therefore be ranked by one or more fitness criteria but may or may not be strictly optimal solutions. Report generator 700 is configured to create graphical, tabular, or other representations of one or more of the optimized market solutions generated.

FIGS. 2A-D depict data structures that can be used to generate a market definition 202 within a target geographic region 204 according to embodiments. As depicted in FIG. 2A market definition generator 200 can receive the target geographic region as an input. In embodiments, geographic region 204 can be defined by user-provided coordinates, or based on one or more regions defined by external entities. For example, in embodiments, geographic region 204 can be defined based on one or more core-based statistical areas (CBSAs) as defined by the U.S. government.

Geographic region 204 can be subdivided into one or more segments, or cells 206, as depicted in FIG. 2B. Cells 206 can be configured to cover the entirety of geographic region 204, and can be a grid of squares, hexagons, or other regularly tessellating polygons in embodiments. In embodiments, cells 206 can have other shapes, such as random shapes, or shapes corresponding to the boundaries of counties or other government-defined regions. In embodiments, cells 206 can comprise a grid of squares, with lengths of one-half mile per side. In order to fully cover geographic region 204, some cells 206 can be partial cells. In some embodiments, partial cells can be ignored.

One or more data elements defining cell attributes 208 can be linked to each cell 206 within geographic region 204, as depicted in FIG. 2C. In embodiments, cell attributes 208 can include geographic information 210, including zoning information, landscape features, or other attributes affecting whether cell 206 is a feasible location for store sites. Cell attributes 208 can further include demographic information 212 (including population, age, average income, or other demographic data), and the locations and formats of existing friendly stores 214, and competitor stores 216. In embodiments, cell attributes 208 can comprise more, fewer, or alternative data elements.

Cell attributes 208 can be gathered from a heterogeneous mix of data sources. One or more cell attributes 208 can be populated from one or more geographical data stores 218, either local or remote to market optimization system 100. In embodiments, one or more cell attributes 208 can be provided by a user through user interface 104, through manual entry or by reference to one or more provided data files. In embodiments, one or more cell attributes 208 can be overridden by data provided by the user. For example the user can insert one or more additional competitor locations or alternative population growth estimates. In embodiments, cell attributes 208 can be populated by econometrics and social data gathered from an existing store fleet.

As depicted in FIG. 2D, market definition generator 200 can be configured to determine, based on cell attributes 208, which cells are infeasible as locations for any store. Infeasible cells 220 are indicated in white in FIG. 2D. Embodiments of market definition generator 200 can support a variety of criteria for feasibility of a cell. For example, cells can be marked infeasible if they are entirely unavailable for commercial development. In embodiments, this determination can be based on zoning (for example, it may not be possible to build any stores in areas zoned for residential use), natural features such as waterways or mountains, and non-usable areas such as parks, wetlands, or military bases. While market definition 202 is pictured as including all cells 206 of geographic area 204 in FIG. 2D, market definition 202 generated by market definition generator 200 may comprise only the set of feasible cells 222 and their associated cell attributes 208. Market definition 202 can further comprise a drive time (or distance) value 224 for each pair of feasible cells 222.

Format constraints processor 300 is configured to determine a set of one or more possible market combinations 302 for each feasible cell 222, in embodiments. A market combination 302 is a set of stores with specific formats that could be selected for a cell 206. In embodiments, a market combination 302 can comprise a null set, including no stores of any format. In some embodiments, store formats can include neighborhood markets, super stores, warehouse stores, and drive-through stores. In embodiments, additional store formats can include the previously listed formats with the addition or removal of one or more features such as fueling stations, or the availability of online pickup. In other embodiments, more, fewer, and/or alternative formats can be used.

In unconstrained scenarios, the set of possible market combinations 302 for each cell could be infinite, with any number of stores of any format available for selection for each feasible cell 222. In order to reduce the search space, one or more constraints 304 for each store format can be considered to the possible market combinations 302 for each cell. FIG. 3A is a block diagram depicting types of constraints that are supported in one embodiment. Supported format constraints can include a maximum number of stores of a format per cell (or maximum density of the format 304a), a list of incompatible formats 304b (for example, a super store and a warehouse store may not exist in the same cell), a minimum lot size 304c, a minimum population 304d, and other demographic requirements 304e (such as, for example, a percentage of the population above or below a certain income level).

In embodiments, format constraints processor 300 can use maximum format density 304a and incompatible formats 304b constraints to determine compatible sets of formats. By way of example, consider the four formats listed above (i.e., neighborhood markets, super stores, warehouse stores, and drive-through stores). Each format can be given a maximum density of one, and each format, except for a neighborhood market as it is defined in this example, is incompatible with all other format types. Therefore, the total set of allowable market combinations for the formats described above can be shown as in Table 1 below:

TABLE 1

| Example Allowable Market Combinations | |
|---|---|
| Store 1 | Store 2 |
| — | — |
| Neighborhood Market | — |
| Super Store | — |
| Warehouse Store | — |
| Drive Through Store | — |
| Super Store | Neighborhood Market |
| Warehouse Store | Neighborhood Market |
| Drive Through Store | Neighborhood Market |

The set of allowable market combinations can then applied to each feasible cell 222 in order to determine which market combinations are possible given the format constraints 304 and the cell attributes 208. For example, while geographic information 210 for a given feasible cell 222 may state that areas within the cell are zoned for commercial use, the zoning restrictions may require that commercial lots be limited to a size that is smaller than the minimum lot size constraint 304c for a warehouse store.

Therefore, each feasible cell 222 can be further associated with a set of possible market combinations 302. FIG. 3B depicts an example market definition, associating the corresponding possible market combinations to three feasible cells a, b, and c. The feasible cells a, b, and c are labeled with identifiers of the market combinations 302a, 302b, and 302c that are possible for the cell. As can be seen in the depicted example, feasible cell c has no possible market combinations 302c.

Figure 3C:
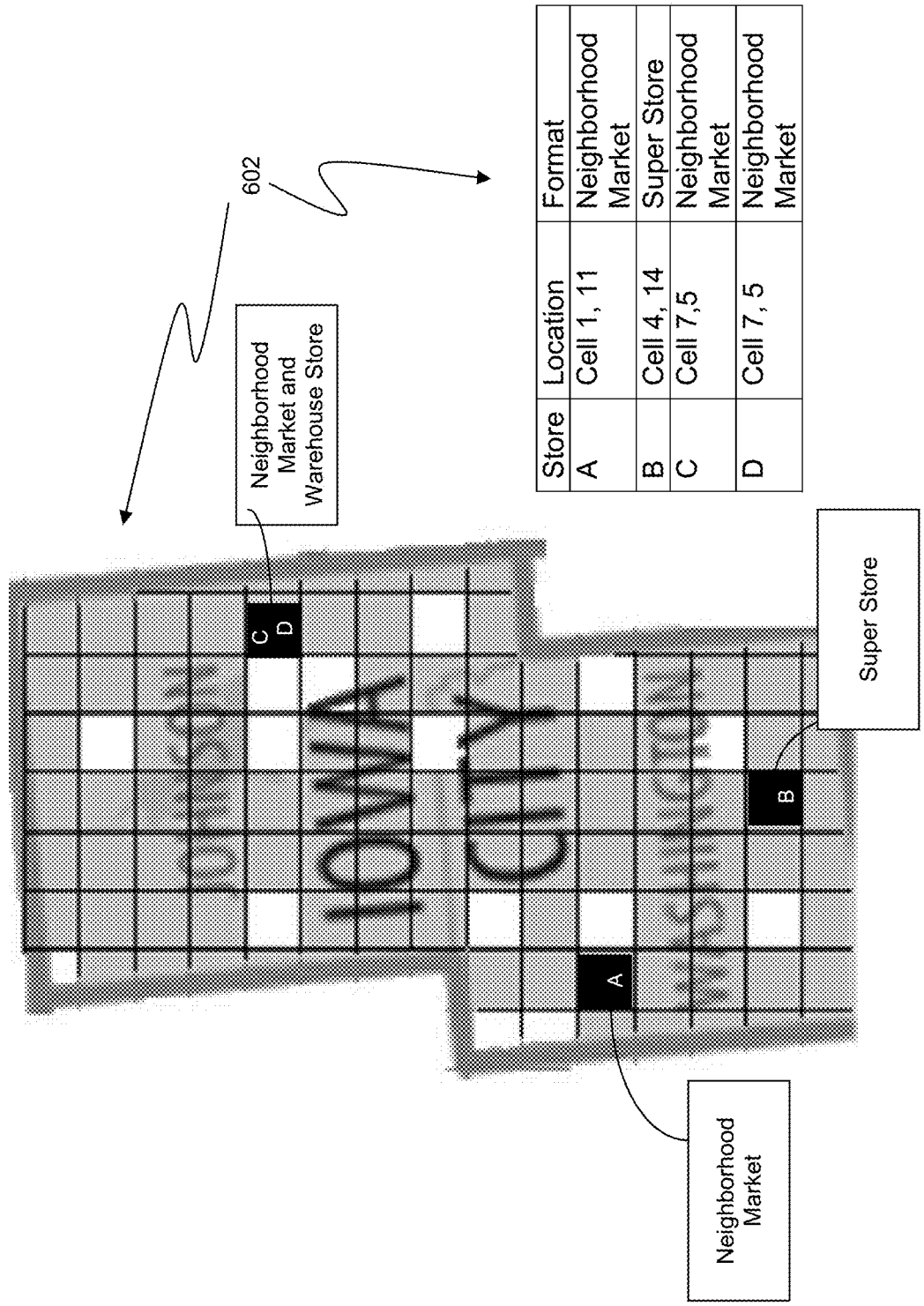
FIG. 3C is a map portion depicting the subdivided geographic area of FIG. 2B indicating a selected market solution, according to an embodiment.

FIG. 3C depicts an example market solution 602, as generated by embodiments of optimizer 600, in both graphical and tabular form. Market solution 602 represents a market plan for a market bounded by geographic region 204. As depicted in FIG. 3C, market solution 602 includes the selection of a possible market combination 302 to each feasible cell 222. As discussed above, each market combination 302 includes zero or more stores (with associated formats). Therefore, in other words, each market solution 602 includes a selection of stores (and formats) in selected locations. Those of ordinary skill in the art will appreciate that while the location for each store is provided in grid coordinates in FIG. 3C, cell numbers, latitude and longitude, or any other system for locating the appropriate cell can be used.

Figure 4A:
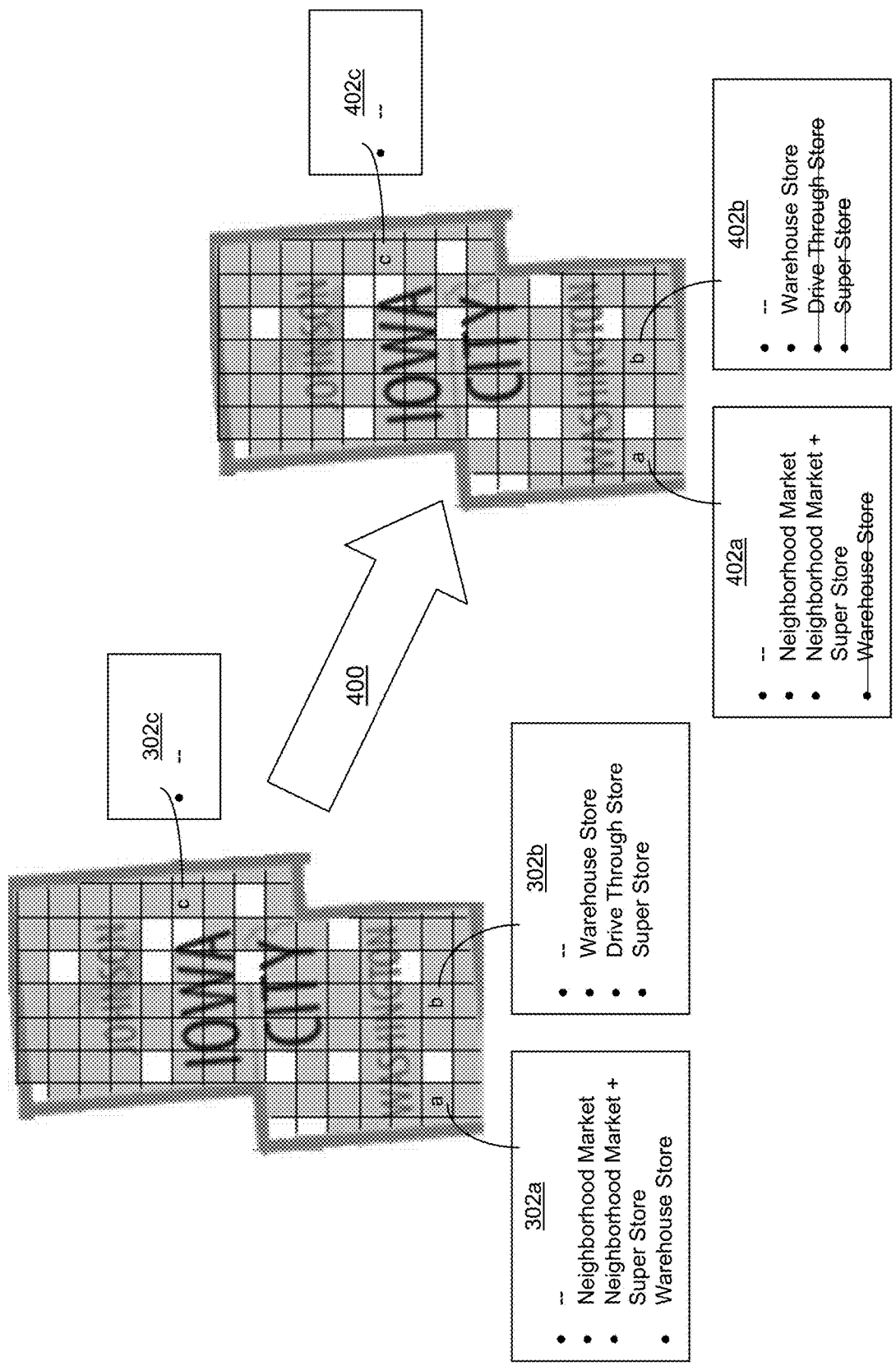
FIG. 4A is a map portion depicting the subdivided geographic area of FIG. 2B indicating possible and viable market combinations, according to an embodiment.
Figure 4B:
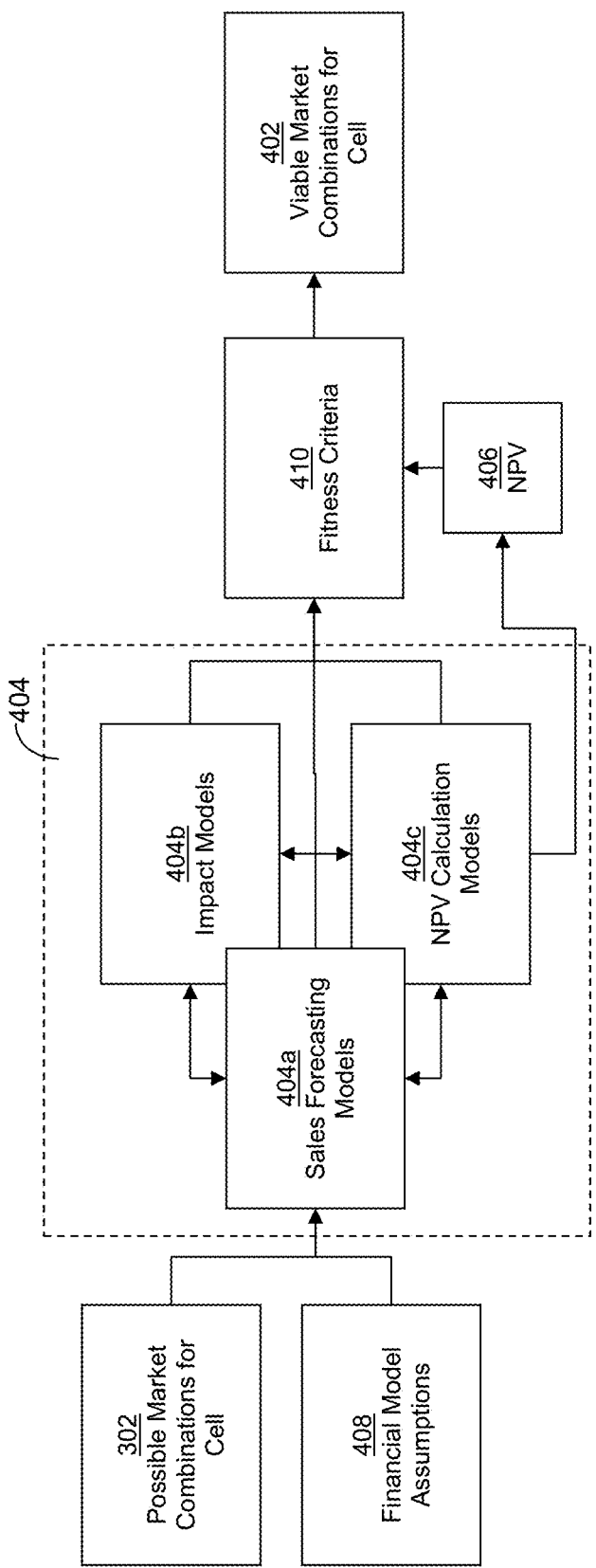
FIG. 4B is a block diagram depicting inputs, outputs and components of a forecaster, according to an embodiment.

FIG. 4A depicts the inputs and outputs of forecaster 400. Because determining the optimality of market solutions 602 can be excessively computationally intensive, forecaster 400 is configured to further filter the set of possible market combinations 302 to produce a set of viable market combinations 402 that meet some minimum standard. In embodiments, viable market combinations 402 can be those market combinations that meet viability criteria such as a positive NPV, positive market share growth, or other business goals based on the results of one or more forecasting models 404, depicted in FIG. 4B and described below.

Forecasting models 404 can include sales forecasting models 404a, which can comprise one or more regression algorithms such as those known in the art to predict the future sales for a store of a given format in a given cell based on cell attributes 208, and historical data from friendly and competitor stores. Sales forecasting models 404a can use variable sets determined by the demographic fabric, the existing friendly store presence, the performance of friendly stores in nearby cells, the competitive landscape (competitor locations and performance), non-competitive (or co-tenant) retail or residential presence and the like.

Forecasting models 404 can further comprise impact models 404b, which can predict the effect that a proposed new store will have on existing (both friendly and competitive) stores in and around the cell. Impact models 404b can enable forecaster 400 to consider incremental sales increases in addition to simply gross sales opportunities for each possible market combination. Forecasting models 404 can further comprise NPV calculation models 404c, based on forecasted sales, capital expenditure and impacts. An NPV 406 can be calculated for each possible market combination 302 in each feasible cell 222.

In embodiments, forecasting models 404 can be configured to calculate outputs using Monte Carlo simulation methods such as those known in the art based on a number of financial model assumptions 408. Variables and weightings for each of the models used in Monte Carlo simulations can be generated using time series, regression, econometrics and social data gathered from an existing store fleet.

Financial model assumptions 408 can include capital availability, gross profit margins, operating expenses (such as wage and utilities costs), real estate expenses, remodeling costs, remodeling frequencies, estimated days until first cash out, days from first cash out to grand opening, land model attributes, corporate tax rate, sales growth over multiple time periods, variable operating expenses, leverage multipliers, and salvage values. Those of ordinary skill in the art will recognized that more, fewer, or alternate financial model assumptions 408 can be used in embodiments. Each of forecasting assumptions 408 can be common across all store formats, or specific to one or more store formats.

Financial model assumptions 408 can be received from a heterogeneous mix of data sources. For example, financial model assumptions 408 can each be received from cell attributes 208, via user input, from existing store data, or from other financial data stores. Because financial model assumptions 408 can be configured by the user, embodiments of forecasting model 404 enable the user to perform scenario analysis or war gaming based on possible future outcomes.

One or more fitness criteria 410 are used to determine the viable market combinations 402 for each feasible cell 222. In some embodiments, fitness criteria 410 can require some minimum value for NPV 406 (for example, the NPV may need to be greater than zero). Other fitness criteria 410 can be used in other embodiments. Each market combination for each cell that meets fitness criteria 410 can be stored in the set of viable market combinations 402.

As depicted in FIG. 5, impact calculator 500 can be configured to calculate an impact value 502 of each viable market combination 402, on the viable market combinations 402 of other cells, in embodiments. The impact models 404b discussed above are configured to consider with existing stores only. Because each market solution 602 can propose adding or removing friendly stores an additional preprocessing of pairwise impacts (or cannibalization) can be beneficial for the optimization process. The preprocessing by impact calculator 500 can enable optimization that considers the cannibalization effect of adding or removing stores. In embodiments, the impact value 502 (NPVImpact) of market combination $N_2$ on market combination $N_1$ can be calculated in a number of ways including the example equation detailed below:

$$NPVImpact_{N_1N_2} = SalesImpact_{N_1N_2} \times$$
$$(GrossProfitPercent - LeverageMultiple + MembershipIncome) \times$$
$$\frac{1.0 - CorporateTax}{DiscountRate - Growth}$$

Where:

$$Sales\_Impact_{N_1\_N_2} = Sales_{N_1} * Impact_{N_1N_2}$$

Where $Impact_{N_1N_2}$ is the percentage sales drop in $N_1$ because of $N_2$:

$$Impact_{N_1-N_2} = \frac{\frac{Sales_{N_2}}{Distance_{N_1N_2}}}{\sum_i \frac{Sales_{N_i}}{Distance_{N_1,i}} + \frac{Sales_{N_2}}{Distance_{N_1N_2}}}$$

And where $Distance_{N_1N_2}$ is based on the drive time 224 previously discussed, in embodiments.

$NPVImpact_{N_iN_j}$ for each pair of market combinations 402 can be stored in memory 102 as impact value 502 for use by optimizer 600. While FIG. 5 depicts example impact values 502 in tabular format, those of ordinary skill in the art will appreciate that other structures for storing impact values 502 can be used.

In embodiments, optimizer 600 can be configured to generate an output including one or more legal market solutions 602, as previously depicted in FIG. 3C. A legal market solution 602 can be a set of market combinations 402 in which each feasible cell 222 has one and only one market combination 402 selected. The solution space for legal market solutions 602 can be optimized such that the total NPV of selections in the solution is maximized, and the NPV impacts across the market combinations selected in the solution are minimized. Classical optimization techniques are often not well suited to multi-variable optimization problems such as these. Therefore, in some embodiments, optimizer 600 can be configured to execute a genetic algorithm in order to produce market solutions. While genetic algorithms are discussed in detail here, other multi-constraint optimization techniques such as linear programming can be used in embodiments.

Genetic algorithms are metaheuristics inspired by the process of natural selection. Genetic algorithms are commonly used to generate high-quality solutions to optimization and search problems by using operators such as mutation, crossover and selection. Genetic algorithms search many peaks in parallel, thereby reducing the possibility of being confined to a local minimum/maximum.

Genetic algorithms can differ from classical, derivative-based, optimization algorithms in two main ways. A classical algorithm generates a single point at each iteration, with the sequence of points approaching an optimal solution. In contrast, a genetic algorithm generates a population of points at each iteration. The best point in the population of points approaches an optimal solution. A genetic algorithm typically generates a population and using a fitness function specifically tailored to the problem at hand, the population evolves towards the optimal solution. At each iteration, analogous to a generation of the population, a genetic algorithm generally performs selection using the operators such as mutation, crossover and selection.

Because genetic algorithms generally need only evaluate the fitness (as defined by an objective function) of each individual in a population to guide the search, they can be more computationally efficient for complex problems. Processing speed can be increased when there is no requirement for derivatives or other intensive calculations.

In embodiments, selection is the operator by which a portion of the existing population is selected to breed the next generation. Individual solutions are selected using the fitness function. Usually these individuals are the elite or the fittest of the population.

A significant part of the subsequent generation is formed by the crossover operation in embodiments, which is analogous to reproduction and biological crossover. Crossover is a process of taking more than one parent individual and producing a child from them.

Mutation is the operator used in embodiments to maintain genetic diversity from one generation to the next. It is analogous to biological mutation. Mutation alters one or more values in a chromosome from its initial state. This operator introduces the random part and ensures spanning of search space.

These operators can ensure that the population is diverse and at the same time converging towards the fittest, i.e. the most optimal solution.

Each point evaluated in a genetic algorithm can be represented by a decision variable. In embodiments of the present disclosure each point can be a legal market solution 602, which can be generated based on the viable market combinations 402 previously determined. The decision variable for a point can be represented as a binary string in embodiments, with binary digit '1' signifying that the corresponding format and cell have been selected. The length of the decision variable (the binary string) is therefore: (total number of feasible cells)*(possible number of market combinations). This binary string is often known in the art as a "chromosome."

As an example, assume that there are only three feasible cells in a given market, and each of them can have any of the market combinations listed in Table 1 above. An example decision variable value could therefore be a 24-digit binary string such as the following: 01111110 10001000 01110111 00010111. In this representation, the first eight digits are for the first cell, the next eight for the second cell, etc.

While the initial population can be chosen randomly, based on the set of viable market combinations, this can result in a very large search space, and the genetic algorithm may take an extended number of iterations to converge (if it does so at all). In some embodiments, therefore, the initial population is chosen such that convergence can be achieved in fewer iterations than would likely be needed using a randomly assigned initial population.

For example, choosing a very large number of stores in an initial population can result in very high cannibalization between them, and the optimization algorithm may fail to find the solution if the initial few iterations are not able to find a single positive NPV solution. In the alternative, choosing a very small number of stores in the initial population may result in slow convergence as the algorithm takes a long time to find an optimal number of stores.

Optimizer 600 can restrict the initial population based on a number of constraints, which can be configurable in embodiments. Examples of initial population constraints can include a maximum number of stores for a given format or a maximum number of new stores. In addition, the initial population can be restricted to only include market combinations having a single store of a single format per cell.

In embodiments, the number of market combinations selected in the initial population can vary with the market size. For example, small markets can be populated with four random market combinations, medium-sized markets can be populated with six random market combinations, and large markets can be populated with eight random market combinations. These starting populations (and the boundaries defining small, medium, and large markets) can be user-configurable. The initial population is a starting point, provided to encourage faster convergence. The final solution can have more or fewer market combinations based on the optimality and constraints.

As is typical in genetic algorithms, once the initial population is generated the next step is to iteratively populate successive generations and improve the fitness of the individuals via selection, crossover and mutation, as discussed above. The fitness of each individual in a generation can be determined by the Net NPV which is the sum of NPV Sales−NPV Impact for all market combinations in the solution. In other words, for a solution having n market combinations, each market combination i will have n−1 sibling market combinations j, and the Net NPV can be calculated as follows:

$$\text{Net NPV} = \Sigma_i(\text{NPVSales}_i - \Sigma \text{NPVImpact}_{i,j})$$

In embodiments, the NPVSales$_i$ can be the NPV 406 previously calculated for the market combination by forecaster 400. In embodiments, NPVImpact$_{i,j}$ can be the impact values 502 for each pair of market combinations calculated by impact calculator 500. Preprocessing of the values used in the fitness function can result in increased efficiency of execution of the genetic algorithm.

In general, a genetic algorithm optimization theoretically stops when the optimal solution is attained. When the problem is complex, such as those supported by embodiments of the present disclosure, there can be multiple optimal solutions and it can be computationally infeasible to obtain them all. Optimizer 600 can therefore use two stopping criteria to help ensure feasible runtimes.

In some embodiments, the optimization process can stop if the fitness of population does not increase for a certain number of generations, sometimes called the stalling or stopping threshold. Generally, if the stopping threshold is well-chosen, hitting it implies that an acceptable approximation of the optimal solution has been reached. In some embodiments, another stopping criterion is reaching a maximum number of iterations.

Figure 7A:
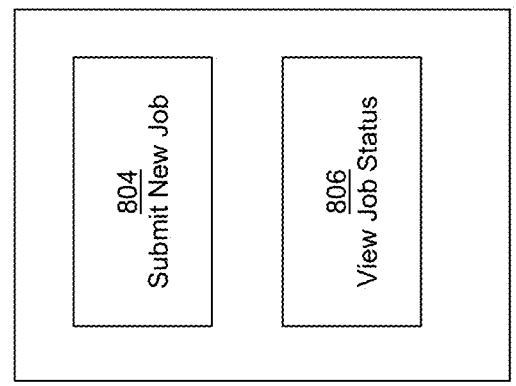
FIG. 7A is a block diagram depicting a sample screen of a user interface, according to an embodiment.
Figure 7B:
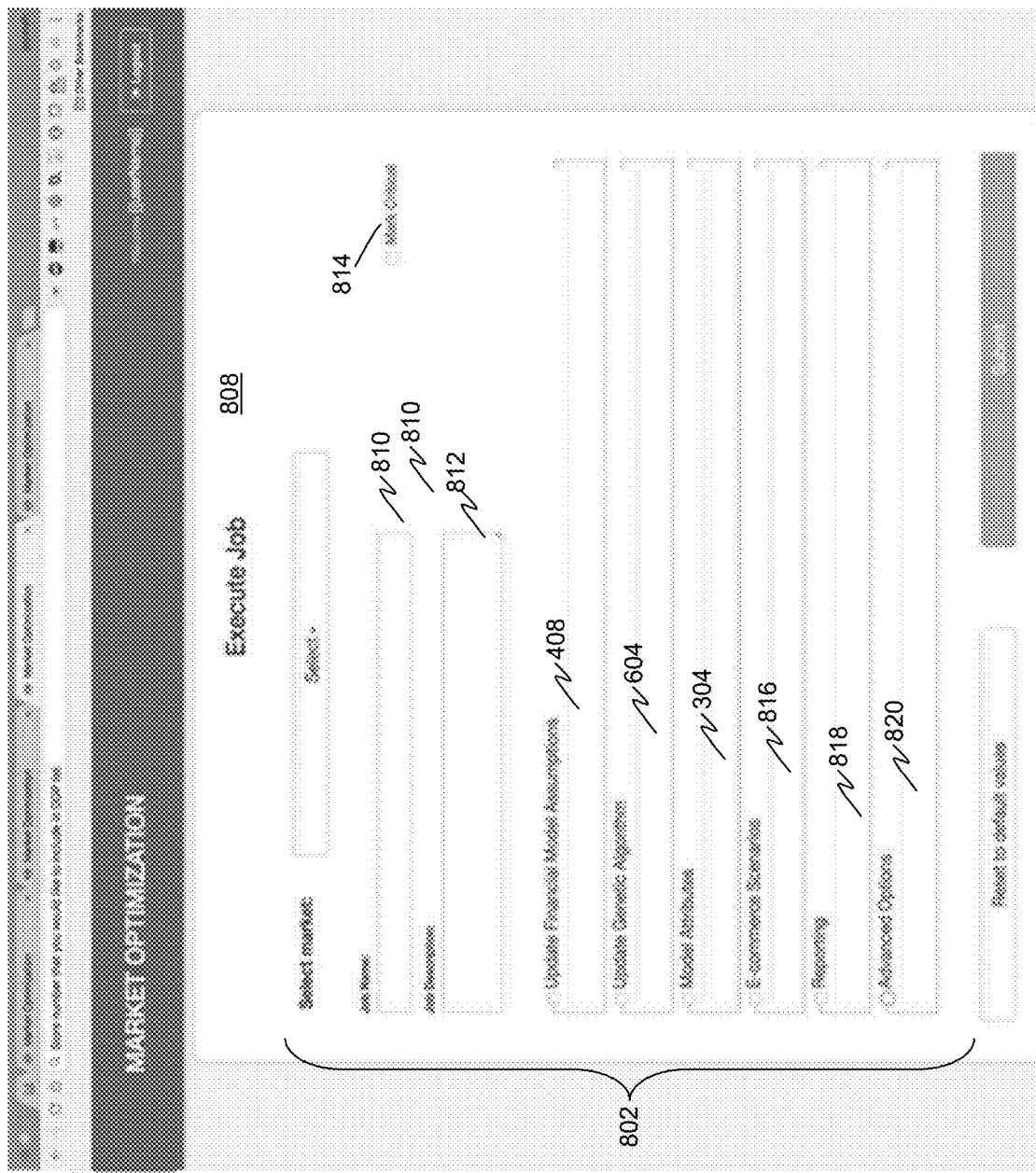
FIG. 7B is a screen shot depicting a sample screen of a user interface, according to an embodiment.

In embodiments, optimizer 600 can receive genetic algorithm parameters 604 (as depicted in FIG. 7B), enabling the user to control and tune the operation of the genetic algorithm. Genetic algorithm parameters 604 can include the stopping threshold, the maximum number of iterations, the total number of stores (or market combinations) selected, the total allowable capital cost, and the maximum number of stores of each format. In embodiments, genetic algorithm parameters 604 can further include tuning parameters such as cross-over probability, mutation probability, and elitism. Cross-over probability is the percentage of the next generation that should be obtained by cross-over. Mutation probability is the percentage of chromosomes in the next generation that should be mutated. Elitism is the number of samples from the previous generation with high fitness to be carried forward in next generation. Those of ordinary skill in the art will recognize that more, fewer, or alternate genetic algorithm parameters 604 can be used.

Genetic algorithm parameters 604 can include additional optimization scenario options such as a market share threshold that each market combination must meet, a minimum allowed NPV, and the selection of one or more fixed market combinations where store location decisions have already been made. Report generator 700 can generate one or more reports detailing the generated market solutions 602.

Figure 6:
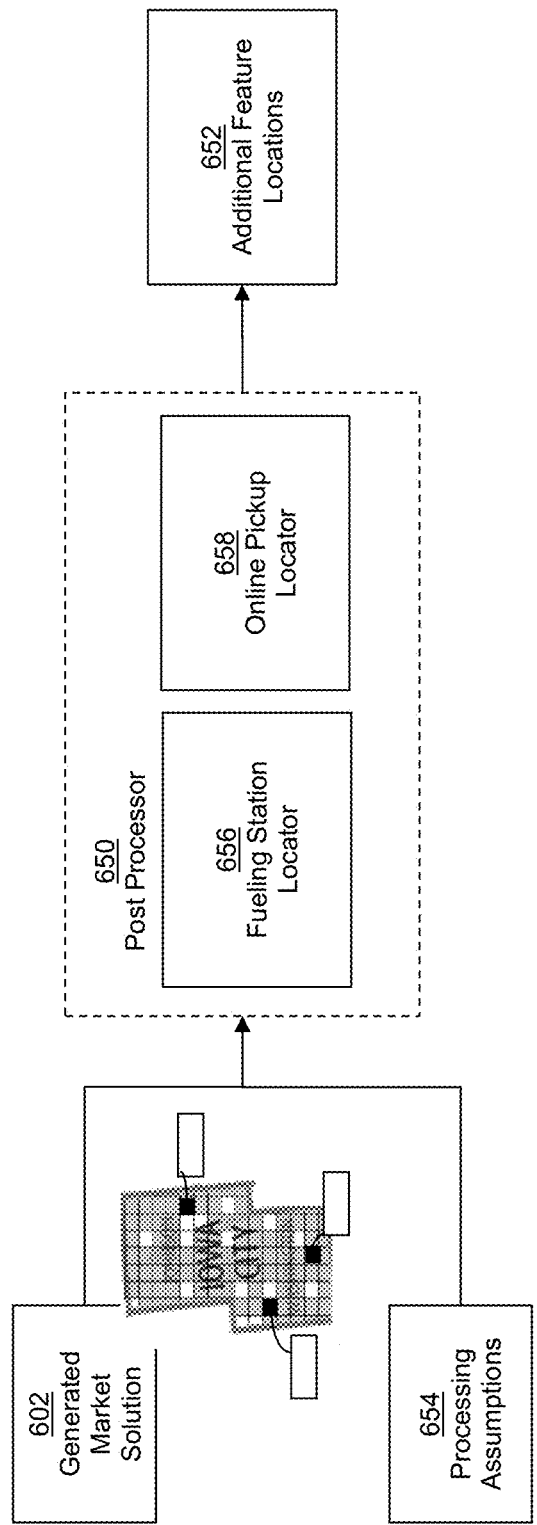
FIG. 6 is a block diagram depicting inputs, outputs and components of a post processor, according to an embodiment.

As can be seen in FIG. 6, post processor 650 can further augment generated market solutions 602 by determining locations within a generated market solution 602 that are optimal for placement of additional features 652 based on received processing assumptions 654. In embodiments, processing assumptions 654 can include a coverage variable, determining the percentage of households within a given geographic area (such as target geographic region 204) within a given distance of the location of an additional feature. In embodiments, the received processing assumptions can further include a demand allocation metric that can indicate the likelihood of customers within the area to use the additional feature. Processing assumptions 654 can further include user-provided lists of stores, market combinations, or cells that must contain the additional feature, or must not contain the additional feature. Post processor 650 can determine locations for additional features based on classical or genetic optimization based on NPV, market share, or other optimization criteria.

In embodiments, post processor 650 can comprise a fueling station locator 656. Fueling station optimizer 656 can receive a generated market solution 602 and determine which stores within the generated market solutions would be most optimal for placement of fueling stations.

In embodiments, post processor 650 can comprise an online pickup locator 658. Online pickup locator 658 can receive a generated market solution 602 and determine which stores within the generated market solutions would be most optimal for placement of areas, kiosks, nodes, or stations for customer pickup of items ordered online. In some embodiments, online pickup optimizer can perform a multi-stage optimization in order to ensure that the coverage variable is met. In a first pass, online pickup locator 658 can assume that online pickup areas must be located in or near stores in the market solution. If the desired coverage cannot be achieved, online pickup optimizer can consider stand-alone online pickup locations (such as lockers, robot-assisted unmanned kiosks, or other location types). In embodiments, fueling station locator 656 can also perform multi-stage optimization to determine standalone fueling station locations.

In embodiments, post processing engine 650 can comprise more, fewer, or alternate locator engines, which can perform single or multi-stage optimization of additional features. Report generator 700 can include any additional feature locations 652 in reports generated based on generated market solutions 602.

In operation, market optimization system 100 can enable a user to submit one or more requests for market optimization. In embodiments, user interface 104 can enable a user to present security credentials to log in, and present a dashboard screen such as that depicted in FIG. 7A. User authentication can be performed via external systems such as OAuth, lightweight directory access protocol (LDAP) or other single sign-on or user authentication services. The dashboard screen can provide user-selectable options to submit a new job 804, or view the status of a job 806.

Job manager 800 can receive job parameters 802, corresponding to the various user-configurable inputs used by components of optimization system 100. Upon user selection of the "submit a new job" option 804, a new job screen 808 as depicted in FIG. 7B, can be presented. In embodiments, job parameters 802 can comprise a job name 810 and job description 812. In embodiments, job parameters 802 can include a critical flag 814 (which can be used to increase the priority of the tasks within the job).

Job parameters 802 received through new job screen 808 can include geographic region, or market 204, cell attributes 208, financial model assumptions 408, genetic algorithm parameters 604, model attributes or format constraints 304, ecommerce scenarios 816 (including upside, downside, and neutral options), reporting options 818, and advanced options 820.

In embodiments, advanced options 820 can include manual updates to cell attributes 208 such as population, competitor locations (including competition stores to exclude from consideration), friendly stores to exclude, and future stores to include or exclude. In addition, advanced options 820 can enable the user to manually specify whether one or more cells are feasible or infeasible, and to override open dates for any existing or new stores.

Figures 7C, 7D:
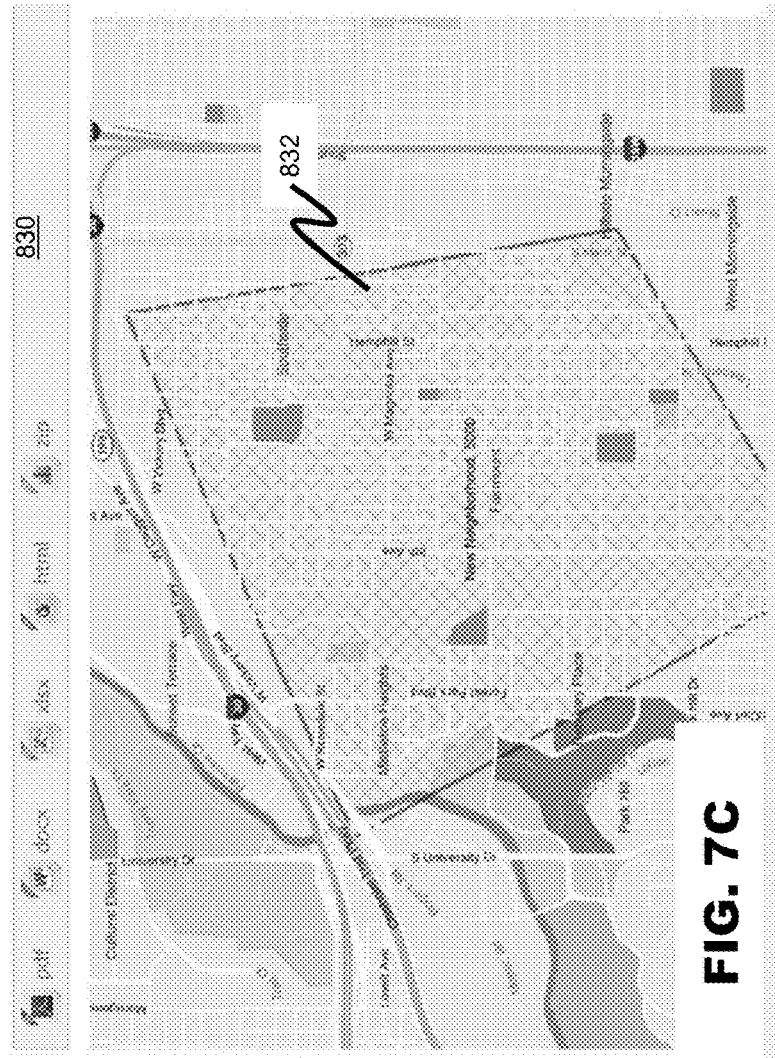
FIG. 7C is a screen shot depicting a sample screen of a user interface, according to an embodiment.
FIG. 7D is screen shot depicting a sample output file, according to an embodiment.

As depicted in FIG. 7C, in embodiments, user interface 104 can present mapping screen 830 to enable the user to define the geographic region 204, or provide manual entries for cell attributes 208, or other location-based job parameters 802. In embodiments, user interface 104 can enable the user to draw a polygon 832 or other region of interest. In embodiments, mapping screen 830 can present controls enabling the user to save the current polygon 832 in a polygon data file 836.

In embodiments, polygon data file 836 can be suitable for processing by data analytics tools such as Alteryx. In embodiments, polygon data file 836 can be stored in one or more file formats 834 such as portable document format (PDF), Microsoft Excel spreadsheet format (XLSX), Microsoft Word document format (DOCX) text format, html format, comma-separated value format, or any other file format. FIG. 7D is a table depicting an example polygon data file 836 according to an embodiment.

After a job is submitted, job manager 800 controls the execution of components of system 100 in order to produce one or more optimized market solutions 602. In embodiments, job manager 800 can be configured to enable multiple jobs to execute simultaneously. In embodiments, user interface 104 can present job status screen 804, enabling the user to view the status of one or more jobs.

Figure 8:
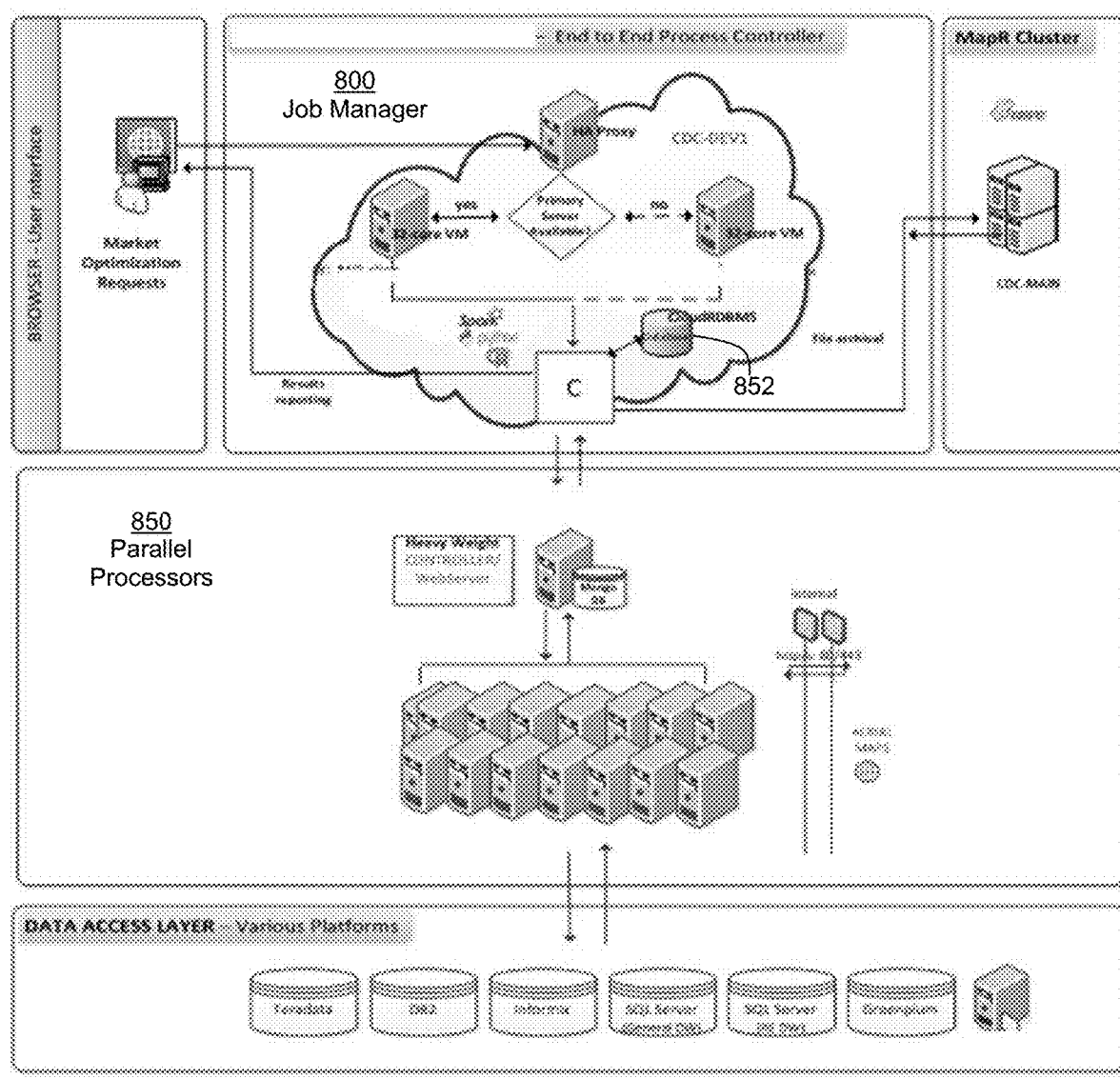
FIG. 8 is a schematic diagram depicting an architecture for a market optimization system, according to an embodiment.

FIG. 8 is a block diagram depicting an architecture for market optimization system 100, according to embodiments. While those of ordinary skill in the art will recognize that many architectures may be provided for system 100, some embodiments of system 100 comprise one or more parallel processors 850. Parallel processors 850 can enable more efficient execution of various tasks of method 1000, depicted in FIG. 1B. For example, the calculation of forecasts for sales, impacts and NPV is independent for each feasible cell 222 during task 1008. Forecaster 400 can therefore perform tasks 1008 and 1010 across multiple feasible cells concurrently. Therefore, these processing tasks can be provided to parallel processors 850 to be performed across multiple feasible cells 222 in unison.

Similarly, impact calculator 500 can calculate the impact of two market combinations as a function of those two market combinations only, as the impact is independent of all the other market combinations selected in the same scenario. Not only can these impacts be calculated in parallel, they can be preprocessed prior to execution of optimizer 600. In embodiments, these calculations can be stored in a table that is hosted on a server as a web service, or in other embodiments of memory 102. By calculating all the impacts using parallel processors 850, the time required to run an optimization can be significantly reduced.

In embodiments, parallel processors 850 can comprise one or more parallel processing architectures known in the art. In an embodiment, forecaster 400 can be configured for execution via an Alteryx data analytics cluster. In an embodiment, impact calculator 500 can be configured for execution via an Apache SPARK system including a MapR converged data platform data store. In embodiments, job manager 800 can further comprise jobs database 852 for storage of job data.

In embodiments, three static process pools can have a fixed number of processes which perform the corresponding tasks, while dynamic pools have a variable number of processes associated with them. For dynamic processes (such as forecasting, impact calculation, and optimizing), computing resources can be assigned on an ad-hoc basis which prevents idle resources in the form of inactive processes.

Figure 9A:
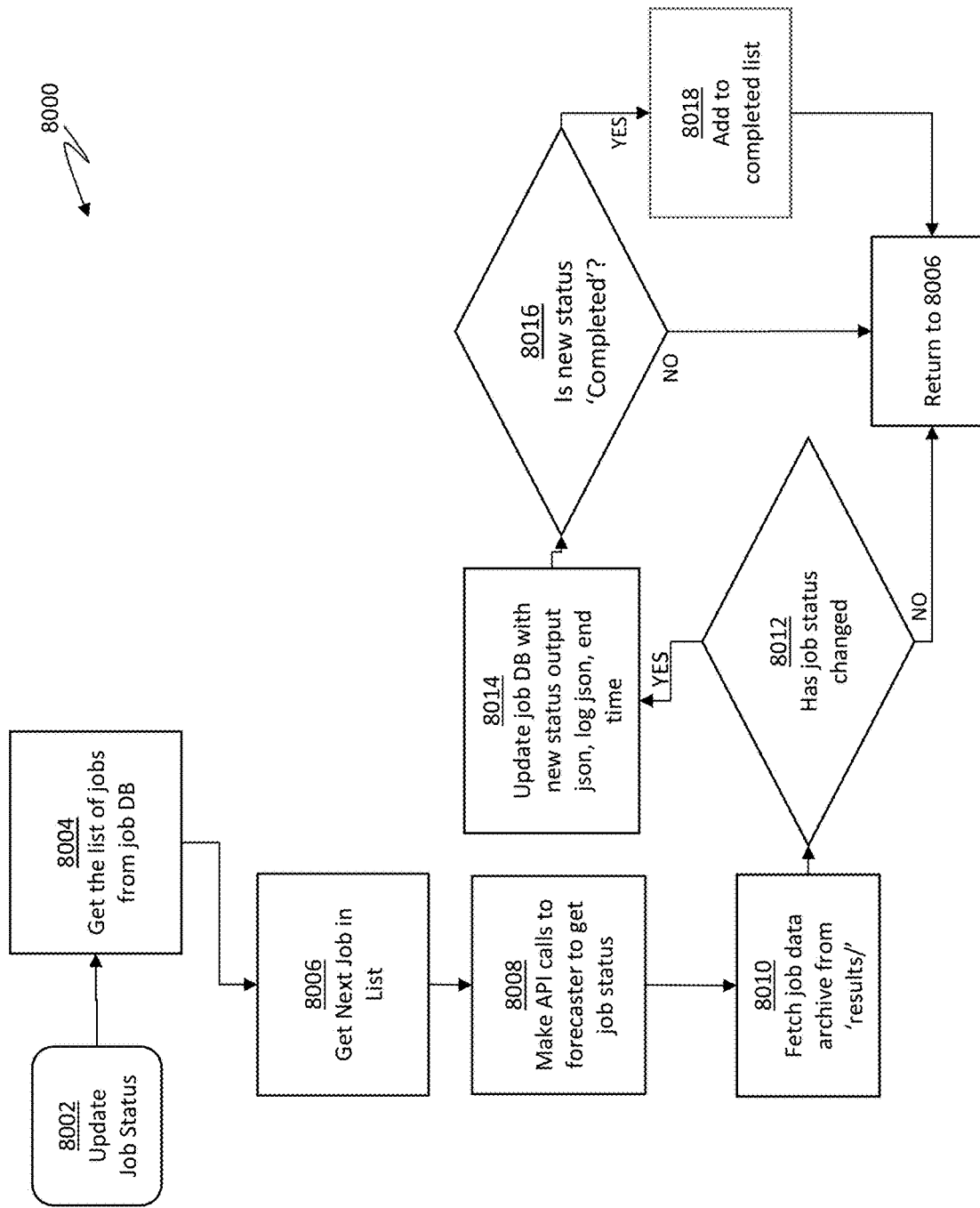
FIG. 9A is a flowchart depicting a job management method, according to an embodiment.
Figure 9B:
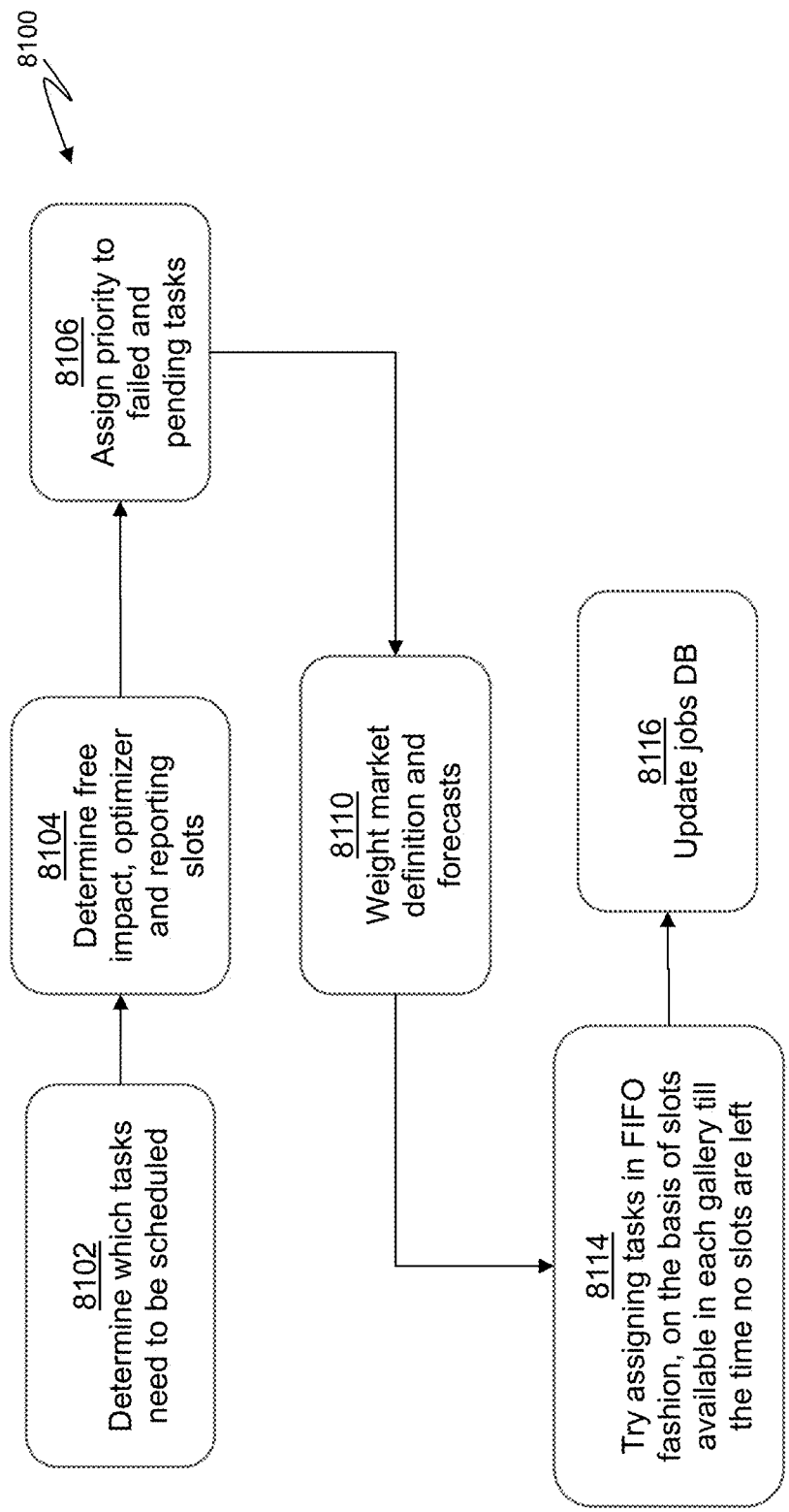
FIG. 9B is a flowchart depicting a job management method, according to an embodiment.
Figure 9C:
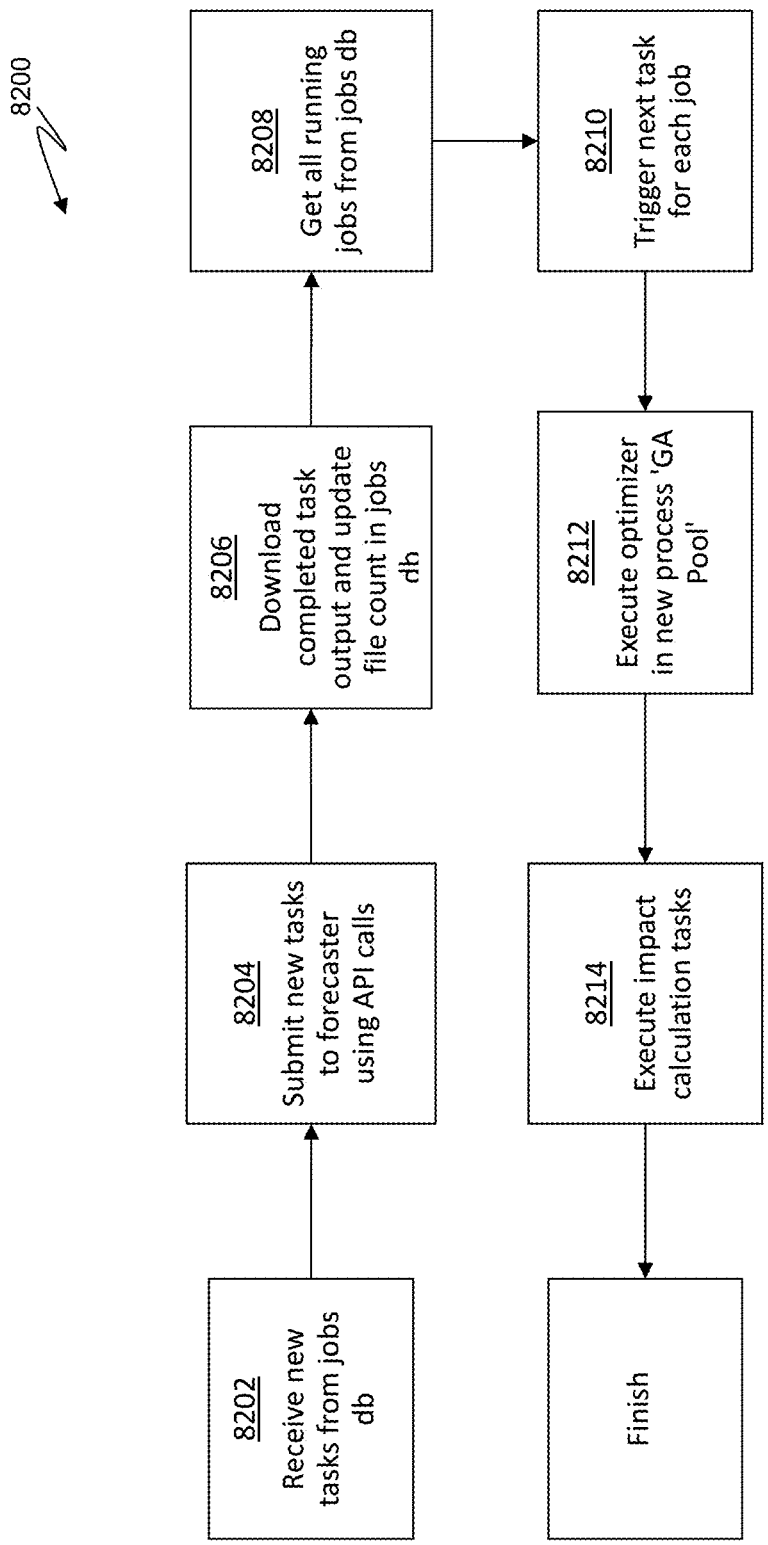
FIG. 9C is a flowchart depicting a job management method, according to an embodiment.

FIGS. 9A-9C are flowcharts depicting various methods performed by embodiments of job manager 800. FIG. 9A depicts method 8000 for updating the jobs database 852 with the status of the current jobs. In embodiments, job manager 800 can update the status of jobs in the jobs database 852 every two minutes at 8002. At 8004, job manager 800 gets the list of jobs from jobs database 852. At 8006, processing of each running, pending, and queued job begins. In embodiments, the updated status of a job can be checked through API calls to the parallel processors 850 at 8008 and/or by looking for the output files at 8010. In case the status of a job changes to "Completed" or "Failed," the database can be updated with the new status at 8014 and 8016.

In embodiments, job manager 800 can comprise a scheduling method 8100 for prioritizing jobs, as depicted in FIG. 9B. When all computing resources are busy, jobs can be queued and job manager 800 can determine which jobs should be run first when resources free up. At 8102, the list of jobs to be scheduled is determined. At 8104, the available resources are determined. At 8106, jobs failed and pending jobs can receive highest priority. At 8110, forecaster and market definition tasks can be weighted by the number of jobs that require the same market definitions and forecasts. At 8114, the remaining jobs can be prioritized on a first in, first out-basis. At 8116, job database 852 can be updated.

FIG. 9C is a flowchart depicting method 8200 for the submission of new tasks, according to embodiments. At 8202, the jobs database 852 is checked for new tasks to be scheduled. At 8204 any tasks to be processed via API calls, such as forecaster tasks, can be submitted. At 8206, any completed task outputs are retrieved. At 8208 the list of running jobs can be retrieved. At 8210, the next task required for each job can be triggered, with optimizer tasks being queued in a dedicated pool at 8212 and impact calculation tasks being queued at 8214.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application-specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A market optimization system for determining one or more optimal market solutions for a geographic area that is divisible into a plurality of cells, each market solution assigning a market combination to each of the plurality of cells, each market combination including zero or more stores each having a format, the system comprising:
   a memory;
   at least one parallel processor;
   a user interface including a mapping screen providing a digital representation of the geographic area;
   a market definition generator configured to:
      receive, via the user interface, a user defined geographic region defining a boundary of the digital representation,
      subdivide the geographic region into the plurality of cells to generate a target cellular data structure,
      associate at least one location attribute with each cell in the target cellular data structure, wherein each cell is representative of a subdivision of the geographic region and the at least one location attribute representative of the feasibility of the cell to be a store site,
      store the target cellular data structure and the at least one location attribute associated with each cell of the target cellular data structure in the memory,
      determine, cell-by-cell for the target cellular data structure using the at least one parallel processor such that at least two cells in the target cellular data structure are operated on concurrently, a set of feasible cells based on the at least one location attribute and one or more feasibility criteria,
      provide a consumer population attribute, an existing store attribute and a competitor information attribute for each feasible cell, and
      store the set of feasible cells in the memory as a feasible cellular data structure;
   a format constraints evaluator configured to:
      determine, cell-by-cell for the feasible cellular data structure using the at least one parallel processor such that at least two cells in the feasible cellular data structure are operated on concurrently, at least one possible market combination for each feasible cell in the feasible cellular data structure based on at least one of:
         the at least one location attribute, the consumer population attribute, the existing store attribute, and the competitor information attribute of the feasible cell, and
         at least one constraint of each format, and
      store each possible market combination in the memory associated with the feasible cell;
   a forecaster configured to:
      determine, cell-by-cell for the feasible cellular data structure using the at least one parallel processor such that at least two cells in the feasible cellular data structure are operated on concurrently, a set of viable market combinations of each feasible cell in the feasible cellular data structure by:
         predicting a first objective value for each of the at least one possible market combinations of the feasible cell, and
         adding each of the at least one possible market combinations of each feasible cell to the set of viable market combinations if the first objective value of the possible market combination meets a first objective threshold, and
      store the set of viable market combinations of each feasible cell in the memory associated with the feasible cell;
   an impact calculator configured to:
      determine an impact value for each pair of market combinations having a first market combination selected from the set of viable market combinations of a first cell and a second market combination selected from the set of viable market combinations of a second cell, and
      store each impact value in a data structure in the memory associated with the first market combination and the second market combination; and
   an optimizer configured to generate an output data structure including one or more legal market solutions ranked by a fitness value,
      each legal market solution having a market combination assigned to each cell of the target cellular data structure whereby:
         each cell that is not in the feasible cellular data structure is assigned a market combination including no stores and
         each cell that is in the feasible cellular data structure is assigned a market combination that is in the set of viable market combinations for the feasible cell, and
      the fitness value being based on the sum of the first objective value of each market combination in the market solution or a second objective value of each market combination, and the impact values for each pair of market combinations in the solution,
      wherein generation of the output data structure comprises:

modifying a population of one or more randomly generated legal market solutions by applying one or more initial population constraints, seeding a genetic algorithm with the population, iterating the genetic algorithm by modifying the population based on the fitness value of each of the one or more legal market solutions of the population, adding the legal market solutions with the highest fitness value to the output, wherein iteration of the genetic algorithm is stopped upon reaching a stopping condition, the stopping condition including a stalling threshold or a maximum number of iterations based on the one or more initial population constraints, and updating the one or more initial population constraints based on the stopping condition reached.

2. The system of claim 1, wherein each of the cells in the plurality of cells is a square in a grid.

3. The system of claim 1, wherein the first objective value is one of net present value, market share, or shareholder return.

4. The system of claim 1, wherein the optimizer comprises a plurality of parallel fitness evaluators each configured to determine a fitness value of a legal market solution, each legal market solution in the population assigned to one of the parallel fitness evaluators such that the fitness value of a plurality of legal market solutions can be determined simultaneously.

5. The system of claim 1, wherein the forecaster comprises a plurality of parallel objective evaluators each configured to determine the first objective value for a market combination, each viable market combination assigned to one of the parallel objective evaluators such that the first objective value for a plurality of viable market combinations can be determined simultaneously.

6. The system of claim 1, wherein the impact calculator comprises a plurality of parallel impact evaluators each configured to determine the impact value of a pair of market combinations, each pair of market combinations having a first market combination selected from the set of viable market combinations of a first cell and a second market combination selected from the set of viable market combinations of a second cell assigned to an impact evaluator such that a plurality of impact values can be determined simultaneously.

7. The system of claim 1, wherein the one or more feasibility criteria include the availability of appropriately zoned land.

8. The system of claim 1, wherein the first objective value for the market combination of a feasible cell is based on the consumer population attribute, the existing store information attribute and the competitor information attribute of the feasible cell.

9. The system of claim 1, wherein the impact value is based on a projected decrease in store revenue of the first market combination caused by the presence of the second market combination.

10. The system of claim 1, further comprising a fueling station locator configured to provide a list of fueling station locations based on a change in the first objective value predicted to result from the addition of a fueling station a selected store of the zero or more stores of a market solution, wherein a fueling station location is added to the list of fueling station locations if the change in the first objective value is positive.

11. The system of claim 1, further comprising an online pickup locator configured to provide a list of online pickup locations based on a change in the first objective value predicted to result from the addition of an online pickup area to a selected cell of a market solution, wherein a cell location is added to the list of online pickup locations if the change in the first objective value is positive.

12. A method for determining one or more optimal market solutions for a geographic area that is divisible into a plurality of cells, each market solution assigning a market combination to each of the plurality of cells, each market combination including zero or more stores each having a format, the method comprising:

providing at least one parallel processor;

providing a user interface including a mapping screen including a digital representation of the geographic area;

receiving, via the user interface, a user defined geographic region defining a boundary of the digital representation;

subdividing the geographic region into the plurality of cells to generate a target cellular data structure;

associating at least one location attribute with each cell in the target cellular data structure, wherein each cell is representative of a subdivision of the geographic region and the at least one location attribute is representative of the feasibility of the associated cell to be a store site, storing the target cellular data structure and the at least one location attribute associated with each cell of the target cellular data structure in the memory, determining, cell-by-cell for the target cellular data structure using the at least one parallel processor such that at least two cells in the target cellular data structure are operated on concurrently, a set of feasible cells based on the at least one location attribute and one or more feasibility criteria as a feasible cellular data structure;

providing a consumer population attribute, an existing store attribute and a competitor information attribute for each feasible cell;

determining cell-by-cell for the feasible cellular data structure using the at least one parallel processor such that at least two cells in the feasible cellular data structure are operated on concurrently, at least one possible market combination for each feasible cell of the set of feasible cells based on at least one of:

the at least one location attribute, the consumer population attribute, the existing store attribute, and the competitor information attribute of the feasible cell, or at least one constraint of each format;

determining cell-by-cell for the feasible cellular data structure using the at least one parallel processor such that at least two cells in the feasible cellular data structure are operated on concurrently, a set of viable market combinations of each feasible cell in the feasible cellular data structure by:

predicting a first objective value for each of the at least one possible market combinations of the feasible cell, and adding each of the at least one possible market combinations of each feasible cell to the set of viable market combinations if the first objective value of the possible market combination meets a first objective threshold;

determining an impact value for each pair of market combinations having a first market combination selected from the set of viable market combinations of a first cell and a second market combination selected from the set of viable market combinations of a second cell, and storing each impact value in a data structure; and generating an output data structure including one or more legal market solutions ranked by a fitness value, each legal market solution having a market combination assigned to each cell of target cellular data structure, whereby— each cell that is not in the feasible cellular data structure is assigned a market combination including no stores and each cell that is in the feasible cellular data structure is assigned a market combination that is in the set of viable market combinations for the cell, and the fitness value being based on the sum of the first objective value of each market combination in the market solution or a second objective value of each market combination, and the impact values for each pair of market combinations in the solution, wherein generation of the output data structure is accomplished by:

modifying a population of one or more randomly generated legal market solutions by applying one or more initial population constraints, seeding a genetic algorithm with the population, iterating the genetic algorithm by modifying the population based on the fitness value of each of the one or more legal market solutions of the population, adding the legal market solutions with the highest fitness value to the output, wherein iteration of the genetic algorithm is stopped upon reaching a stopping condition, the stopping condition including a stalling threshold or a maximum number of iterations based on the one or more initial population constraints, and updating the one or more initial population constraints based on the stopping condition reached.

13. The method of claim 12, wherein each of the one or more cells is a square in a grid.

14. The method of claim 12, wherein the first objective value is one of net present value, market share, or shareholder return.

15. The method of claim 12, further comprising determining the fitness value of a plurality of legal market solutions simultaneously.

16. The method of claim 12, further comprising determining the first objective value of the plurality of possible market combinations simultaneously.

17. The method of claim 12, further comprising determining the impact value of a plurality of pairs of market combinations simultaneously.

18. The method of claim 12, wherein the one or more feasibility criteria include the availability of appropriately zoned land.

19. The method of claim 12, wherein the first objective value for the market combination of a feasible cell is based on the consumer population attribute, the existing store information attribute and the competitor information attribute of the feasible cell.

20. The method of claim 12, wherein the impact value is based on a projected decrease in store revenue of the first market combination caused by the presence of the second market combination.

21. The method of claim 12, further comprising providing a list of fueling station locations based on a change in the first objective value predicted to result from the addition of a fueling station to a selected store of the zero or more stores of a market solution, wherein a fueling station location is added to the list of fueling station locations if the change in the first objective value is positive.

22. The method of claim 12 further comprising providing a list of online pickup locations based on a change in the first objective value predicted to result from the addition of an online pickup area to a selected cell in a market solution, wherein a cell location is added to the list of online pickup locations if the change in the first objective value is positive.

* * * * *